Patented Feb. 17, 1942

2,273,473

UNITED STATES PATENT OFFICE 2,273,473

COLORING RUBBER HYDROCHLORIDE CEMENTS

James A. Merrill, Akron, Ohio, assignor to Wingfoot Corporation, Wilmington, Del., a corporation of Delaware No Drawing. Application January 26, 1937, Serial No. 122,408

3 Claims. (Cl. 260—738)

This invention relates to coloring rubber hydrochloride cements with insoluble coloring matter. The cement may later be employed for the manufacture of pellicles or for coating or any desired use. The invention includes the coloring process and the colored rubber hydrochloride products resulting therefrom.

Although rubber hydrochloride cements designed for certain uses may be colored by grinding insoluble coloring matter into them to obtain a uniform dispersion of the coloring matter in the cement, for other purposes it has been found disadvantageous to subject the rubber hydrochloride cement to grinding. This invention therefore relates to the homogeneous incorporation of insoluble coloring matter into a rubber hydrochloride cement without subjecting the cement to any grinding operation.

According to the invention the coloring matter is first incorporated into rubber or a rubber derivative which is compatible with the rubber hydrochloride. When rubber is used it softens the resulting film or other rubber hydrochloride product. The rubber derivatives which may be employed include chlorinated rubbers and condensation derivatives of rubber prepared as known in the art by treating rubber with chlorostannic acid, the halide of an amphoteric metal, a sulfonic acid or any of the known condensing agents. Other rubber derivatives may be used as well as gutta percha and balata and derivatives thereof. The pigment may, if desired be milled into a small amount of a rubber hydrochloride, preferably stabilized by hexamethylene tetramine or other inhibitor mentioned in Calvert 1,989,632, and the resulting mixture may then be dissolved in the balance of the rubber hydrochloride dispersed in a solvent. When rubber hydrochloride cement is to be used for the casting of films for wrapping purposes it has been found desirable to use a condensation derivative of rubber since this may be added to the rubber hydrochloride cement in small amounts without materially changing the properties of the film eventually obtained. The rubber condensation derivative may, for example, be prepared according to Sebrell U. S. Patent 2,052,423.

In coloring the rubber hydrochloride cement more or less of the rubber derivative may be employed. Up to 10 or 15% of a rubber condensation derivative prepared by treating rubber with chlorostannic acid as described in the Sebrell patent has been employed and the cement cast into satisfactory film.

Example.—Titanium dioxide was milled into a rubber condensation derivative such as the chlorostannic acid derivative referred to, until a homogeneous dispersion of the titanium dioxide in the rubber derivative was obtained which contained one part of titanium dioxide for each two parts by weight of the rubber derivative. Eighteen parts by weight of the resulting colored product were stirred into a rubber hydrochloride cement obtained by dispersing 100 parts of rubber hydrochloride (of about 29.5 to 30% chlorine content) in 1400 parts by weight of benzol. A film about .001 inches thick cast from the resulting cement after drying was highly flexible and suitable for wrapping purposes, etc. The cement was likewise satisfactory for coating paper and fabrics. It was pure white in color and had a high gloss. The rubber hydrochloride may be prepared as described in Calvert U. S. Patent 1,989,632. The rubber hydrochloride cement prepared as there described may be used. It may contain a photochemical inhibitor such as hexamethylene tetramine, but this is not essential.

Instead of titanium oxide other insoluble pigments may similarly be incorporated in rubber hydrochloride film such as aluminum powder, chromium oxide, iron oxide, carbon black, zinc sulfide, etc. A high percentage of pigment gives an opaque film. Lesser amounts give films of varying degrees of transparency.

In selecting the rubber derivative to be employed as a carrier for the coloring matter, some discretion is necessary as ordinarily one will wish to employ a carrier which is dispersible in the solvent of the cement. Various solvents may be used such as chloroform, benzol, etc. A substantially unoxidized condensation derivative rubber prepared according to the Sebrell patent is dispersible in chloroform and benzol and may be employed to advantage.

I claim:

1. The method of coloring a rubber hydrochloride cement with insoluble coloring matter which comprises milling the coloring matter into a material of the class consisting of rubber, gutta percha, balata and condensation derivatives of rubber, which material is compatible with rubber hydrochloride and dispersing the colored material and the rubber hydrochloride in a solvent for the same.

2. The method of coloring rubber hydrochloride cement with insoluble coloring matter which comprises milling the coloring matter into a condensation derivative of rubber which is soluble in the solvent used in the rubber hydrochloride cement and then dissolving the resulting colored mixture and the rubber hydrochloride in said solvent.

3. A thin, flexible film composed largely of rubber hydrochloride and a small amount of a condensation derivative of rubber and containing insoluble coloring matter, the condensation derivative and the coloring matter being uniformly dispersed in the rubber hydrochloride and the rubber hydrochloride having the properties of unmilled rubber hydrochloride.

JAMES A. MERRILL.